US008286358B2

(12) United States Patent
Kuragano

(10) Patent No.: US 8,286,358 B2
(45) Date of Patent: Oct. 16, 2012

(54) PORTABLE CUTTING TOOL

(75) Inventor: Shinji Kuragano, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 523 days.

(21) Appl. No.: 12/512,927

(22) Filed: Jul. 30, 2009

(65) Prior Publication Data

US 2010/0024224 A1 Feb. 4, 2010

(30) Foreign Application Priority Data

Jul. 31, 2008 (JP) ................................ 2008-198803

(51) Int. Cl.
*B23D 47/02* (2006.01)
*B23D 45/16* (2006.01)
*B27B 9/02* (2006.01)

(52) U.S. Cl. ........................................ 30/377; 30/376

(58) Field of Classification Search .................... 30/376, 30/377, 388, 390, 391
See application file for complete search history.

(56) References Cited

U.S. PATENT DOCUMENTS

| | | | | |
|---|---|---|---|---|
| 1,854,510 A * | 4/1932 | Haas | 30/376 |
| 2,761,474 A * | 9/1956 | Dolan | 30/376 |
| 3,662,796 A * | 5/1972 | Batistelli | 30/390 |
| 4,221,051 A | 9/1980 | Glass | |
| 4,353,165 A * | 10/1982 | Albery | 30/376 |
| 4,870,758 A | 10/1989 | Fushiya | |
| 5,010,651 A * | 4/1991 | Techter et al. | 30/376 |
| 5,235,752 A * | 8/1993 | Sauerwein et al. | 30/377 |
| 5,758,425 A * | 6/1998 | Gallagher et al. | 30/376 |
| 6,601,305 B1 * | 8/2003 | Fukuoka | 30/376 |
| 6,708,411 B2 * | 3/2004 | Kani | 30/376 |
| 7,874,075 B2 * | 1/2011 | Niwa et al. | 30/377 |
| 2005/0278960 A1 * | 12/2005 | Niwa | 30/388 |

FOREIGN PATENT DOCUMENTS

| | | | |
|---|---|---|---|
| CN | 101024289 A | 8/2007 |
| DE | 100 52 610 A1 | 5/2002 |
| EP | 1 607 198 A1 | 12/2005 |
| JP | 2006-346909 A | 12/2006 |
| JP | 2007-223133 A | 9/2007 |
| WO | WO 2005/118195 A2 | 12/2005 |

OTHER PUBLICATIONS

Chinese Office Action of Sep. 16, 2010 and English translation thereof.

Extended European Search Report of Aug. 3, 2011 related to the corresponding European patent application.

* cited by examiner

*Primary Examiner* — Hwei C Payer

(74) *Attorney, Agent, or Firm* — Kilpatrick Townsend & Stockton LLP

(57) ABSTRACT

The portable cutting tool includes a housing that rotatably supports a cutting blade, a base to be connected with the housing and having an opening through which the cutting blade is protrudable, and a protrusion amount changing mechanism. The protrusion amount changing mechanism has a link part extending from the base, and a fixing part which is provided at the housing, comes to a fixed state with respect to the link part when moved in one direction in a direction orthogonal to a rotational shaft of the cutting blade, and comes to a moving state to be movable with respect to the link part when moved in an other direction in the direction orthogonal to the rotational shaft, whereby a protrusion amount of the cutting blade from the second side of the opening is changed as the fixing part is moved with respect to the link part.

8 Claims, 10 Drawing Sheets

PORTABLE CUTTING TOOL

CROSS-REFERENCES TO RELATED APPLICATIONS

This application claims the priority of Japanese Patent Application No. 2008-198803 filed on Jul. 31, 2008, the contents of which are incorporated herein by reference in their entirety.

BACKGROUND OF THE INVENTION

1. Field of the Invention

The present invention relates to a portable cutting tool, and, particularly, to a mechanism which adjusts the cutting depth of a cutting blade.

2. Description of the Related Art

There are following two structures relating to adjustment of the cutting depth of a conventional portable cutting tool. One structure has a cutting-depth adjustment link provided on one side of a protection cover which protects the cutting blade, urges the adjustment link from a side surface of the protection cover in axial direction of the rotational shaft of the cutting blade using a screw or the like, and fixes the adjustment link at an arbitrary position. The other structure has a cutting-depth adjustment link provided rearward of a protection cover, and fixes the adjustment link at an arbitrary position from the rearward of the protection cover using a cam-based fastening tool, as disclosed in Unexamined Japanese Patent Application KOKAI Publication No. 2007-223133 (Patent Document 1).

At the time the adjustment link is fixed from the side surface by a screw or the like, the adjustment link is urged in the axial direction of the rotational shaft of the cutting blade. In this case, deformation may occur in the adjustment link in the axial direction of the rotational shaft of the cutting blade, lowering the parallelism of the cutting blade with respect to the cutting tool. In addition, while the structure described in Patent Document 1 hardly causes lowering of the parallelism of the cutting blade, the overall cutting tool is likely to become large in size for the fastening tool protrudes from the rear end of the protection cover.

SUMMARY OF THE INVENTION

Accordingly, it is an object of the present invention to provide a compact portable cutting tool capable of adjusting the cutting depth of the cutting blade while keeping the parallelism thereof.

To achieve the object, a portable cutting tool according to the invention includes:

a housing that rotatably supports a cutting blade which is driven by a motor to cut a workpiece;

a base having a first side to be connected with the housing, and a second side being another side of the first side of the base and abutting on the workpiece, and having an opening which penetrates the first side and the second side and through which the cutting blade is protrudable from the second side; and a protrusion amount changing mechanism that has a link part extending from one of the base and the housing, and a fixing part which is provided at an other one of the base and the housing, is arranged opposite to a side surface of the cutting blade, comes to a fixed state with respect to the link part when moved in one direction in a direction orthogonal to a rotational shaft of the cutting blade, and comes to a moving state to be movable with respect to the link part when moved in an other direction in the direction orthogonal to the rotational shaft, whereby a protrusion amount of the cutting blade from the second side is changed as the fixing part is moved with respect to the link part.

The fixing part includes:

a lever part rotatably supported about an axis parallel to the rotational shaft of the cutting blade;

an abutment portion that moves in the one direction by a predetermined rotational operation of the lever part to abut on the link part; and a guide part that is provided in such a way as to guide the fixing part to be relatively movable along the link part and hold the link part between the guide part and the abutment portion, and cooperates therewith to set the fixing part to be in the fixed state with respect to the link part, at a time the abutment portion abuts on the link part.

The link part has an elongated hole formed therein and extending in a direction of extension thereof, the guide part is disposed movably in the elongated hole, and the abutment portion and the guide part hold the link part in a direction orthogonal to the rotational shaft.

The link part is an elongated member whose lengthwise direction is a direction of extension, and the abutment portion and the guide part hold the link part in a direction orthogonal to the rotational shaft.

The abutment portion has a cam which rotates about an axis parallel to the rotational shaft.

The abutment portion has an elastic member interposed between the cam and the link part, and the cam abuts on the link part via the elastic member.

The cam has an elastically deformable elastic region at a cam lobe part, and abuts on the link part at the elastic region.

The cam is held in an abutment state to be abutment with the link part, and when the housing is moved with respect to the base to increase the protrusion amount of the cutting blade from the second side, the cam rotates in such a direction that the cam lobe abuts on the link part.

The motor is disposed facing one side surface of the cutting blade, and the fixing part is disposed between the motor and the cutting blade in a direction parallel to the rotational shaft of the cutting blade.

The housing further includes a saw cover that covers substantially a half of that portion of an outer periphery of the cutting blade which protrudes above the first side, and a pivotal support part that connects the housing to the base in such a way as to be pivotable about an axis parallel to the rotational shaft is provided near one end portion of the saw cover.

A first tilt support part that pivotably supports the protrusion amount changing mechanism about an axis orthogonal to the rotational shaft and parallel to the base is provided between the protrusion amount changing mechanism and the base, and a second tilt support part that pivotably supports the pivotal support part coaxially with the first tilt support part is provided between the pivotal support part and the base.

The portable cutting tool according to the invention can be made compact while keeping the parallelism of the cutting blade at the time of adjusting the cutting depth thereof.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Figure 1:
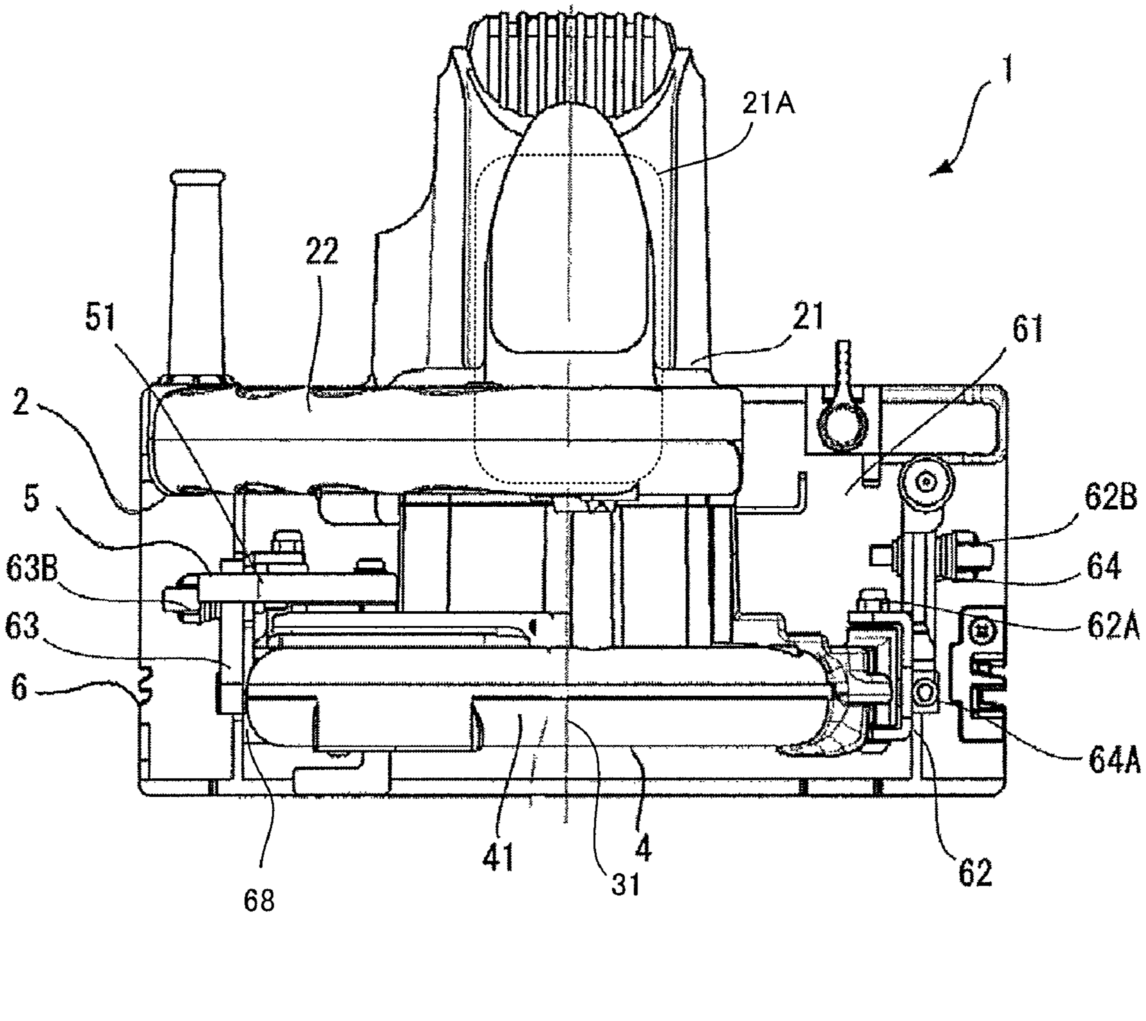
FIG. 1 is a plan view of a portable cutting tool according to an embodiment of the present invention.

A portable cutting tool according to an embodiment of the present invention will be described with reference to FIGS. 1 to 4. A circular saw 1, which is a portable cutting tool, shown in FIGS. 1 and 2 mainly includes a housing 2 provided with a saw cover 4, a circular saw blade 3, a protrusion amount changing mechanism 5, and a base part 6.

The housing 2 mainly includes a motor accommodation part 21 accommodating a motor 21A therein, and a handle 22 integral with the motor accommodation part 21. A drive system (not shown) which is driven by the motor 21A is provided in the saw cover 4. The drive system rotationally drives the circular saw blade 3.

As shown in FIG. 1, the handle 22 is provided with a switch 22A for controlling driving of the motor 21A, and a stopper (not shown) for holding the switch 22A in an ON state.

Figure 2:
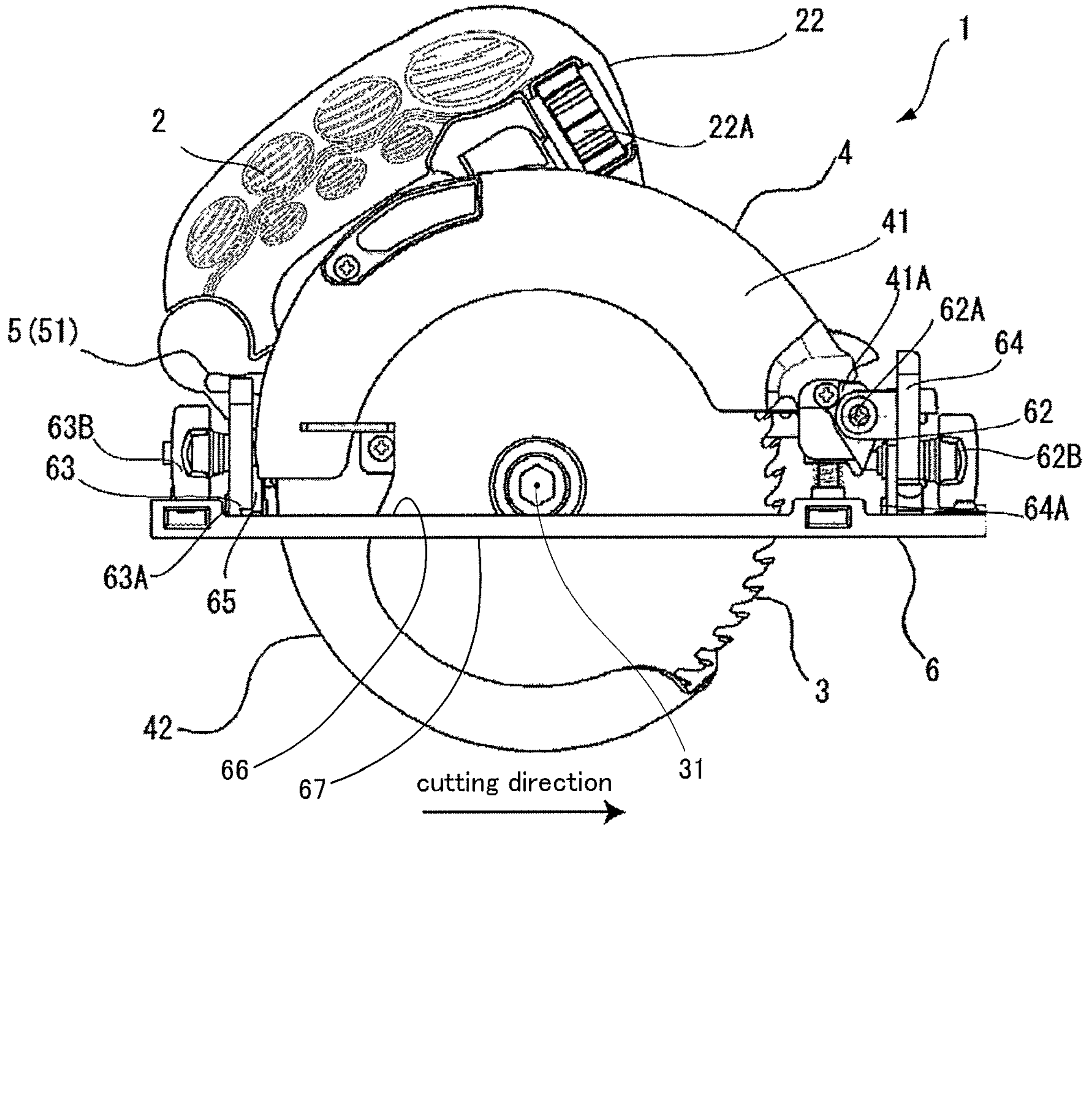
FIG. 2 is a side view of the portable cutting tool shown in FIG. 1.

As shown in FIG. 1, the saw cover 4 is connected to the housing 2 on the opposite side to the motor accommodation part 21 with the handle 22 in between. As shown in FIG. 2, the saw cover 4 includes a saw cover body part 41 integral with the housing 2 and constituting a part of the housing 2, and a safety cover 42 provided on the saw cover body part 41. The saw cover 4 covers the circular saw blade 3.

The saw cover body part 41, which is made from a metal, covers substantially a half of the circular saw blade 3 as shown in FIG. 2. A joint part 41A to be connected to a pivotal support part 62 to be described later is provided at one end portion of the saw cover body part 41 in a circumferential direction thereof (right-hand end portion in FIG. 2). As shown in FIG. 1, the protrusion amount changing mechanism 5 is provided at the saw cover body part 41 between the circular saw blade 3 and the motor 21A at a position facing one side of the circular saw blade 3.

The safety cover 42 is provided at the saw cover body part 41 at the other end portion thereof in the circumferential direction thereof (left-hand end portion in FIG. 2) in such a way as to be pivotable in the circumferential direction thereof about a rotational shaft 31 of the circular saw blade 3 as the center axis along the outer periphery of the saw cover body part 41. A spring (not shown) is interposed between the saw cover body part 41 and the safety cover 42. This spring urges the safety cover 42 in the circumferential direction of the saw cover body part 41 from the one end portion toward the other end portion of the saw cover body part 41. As shown in FIG. 2, while cutting work is not carried out, the safety cover 42 covers that portion of the circular saw blade 3 which is not covered by the saw cover body part 41, counterclockwise from the other end portion of the saw cover body part 41 toward the one end portion thereof. There is a portion formed between the one end portion of the saw cover body part 41 and the safety cover 42 where the circular saw blade 3 is exposed. This exposed portion serves to cut a wooden material as a workpiece, and the circular saw 1 moves forward for cutting the workpiece in a direction from the other end portion of the saw cover body part 41 to the one end portion thereof, as shown by an arrow in FIG. 2. In the following description, the direction from the other end portion of the saw cover body part 41 to the one end portion thereof is defined as a cutting direction, and the one end side of the saw cover body part 41 is defined as a leading end side in the cutting direction while the other end side is defined as a rear side in the cutting direction.

As shown in FIG. 1, the base part 6 mainly includes a base member 61, the pivotal support part 62, a first bevel plate 63, a second bevel plate 64, and a link connecting part 65 (see FIG. 2) serving as an adjustment guide. The base part 6 pivotably and tiltably supports the housing 2, the circular saw blade 3, and the saw cover 4 on a top side 66 (first side) in FIG. 2. The base part 6 abuts on the workpiece on a bottom side 67 (second side) in FIG. 2. The base member 61 is a main constituent of the base part 6 and is made by a substantially rectangular metal plate. The lengthwise direction of the base member 61 matches with the cutting direction. An elongated opening 68 (partly shown in FIG. 1) extending in parallel to the lengthwise direction of the base member 61 is formed in the base member 61, penetrating from the top side 66 to the bottom side 67. The opening 68 has a size large enough for the circular saw blade 3 and the safety cover 42 to pass there-through.

As shown in FIG. 1, the second bevel plate 64 and the pivotal support part 62 are provided at the base member 61 at a front side position of the opening 68 in the cutting direction. As shown in FIG. 1, the second bevel plate 64 is provided vertically upright at the base member 61 in parallel to a short-side direction of the base member 61 which is substantially orthogonal to the cutting direction. The second bevel plate 64 has a second tilt axis part 64A (second tilt support part) extending in the cutting direction. An elongated hole (not shown) which is arcuate about the second tilt axis part 64A is formed in the second bevel plate 64.

As shown in FIG. 1, the pivotal support part 62 is supported tiltably and pivotally in a direction orthogonal to the cutting direction, i.e., about an axis parallel to the cutting direction, by the second tilt axis part 64A. The pivotal support part 62 has a pair of arm parts extending toward the rear side in the cutting direction. The arm part is provided with a pivotal axis part 62A whose axial direction is orthogonal to the cutting direction. This pivotal axis part 62A pivotally supports the joint part 41A positioned at the front side of the saw cover body part 41 in the cutting direction.

A screw 62B to be screwed into a screw hole (not shown) formed in the pivotal support part 62 and penetrating through the elongated hole (not shown) of the second bevel plate 64 is provided at the pivotal support part 62. Fastening the screw 62B, the tilt angle of the pivotal support part 62 relative to the second bevel plate 64 can be fixed at an arbitrary angle.

Figure 3:
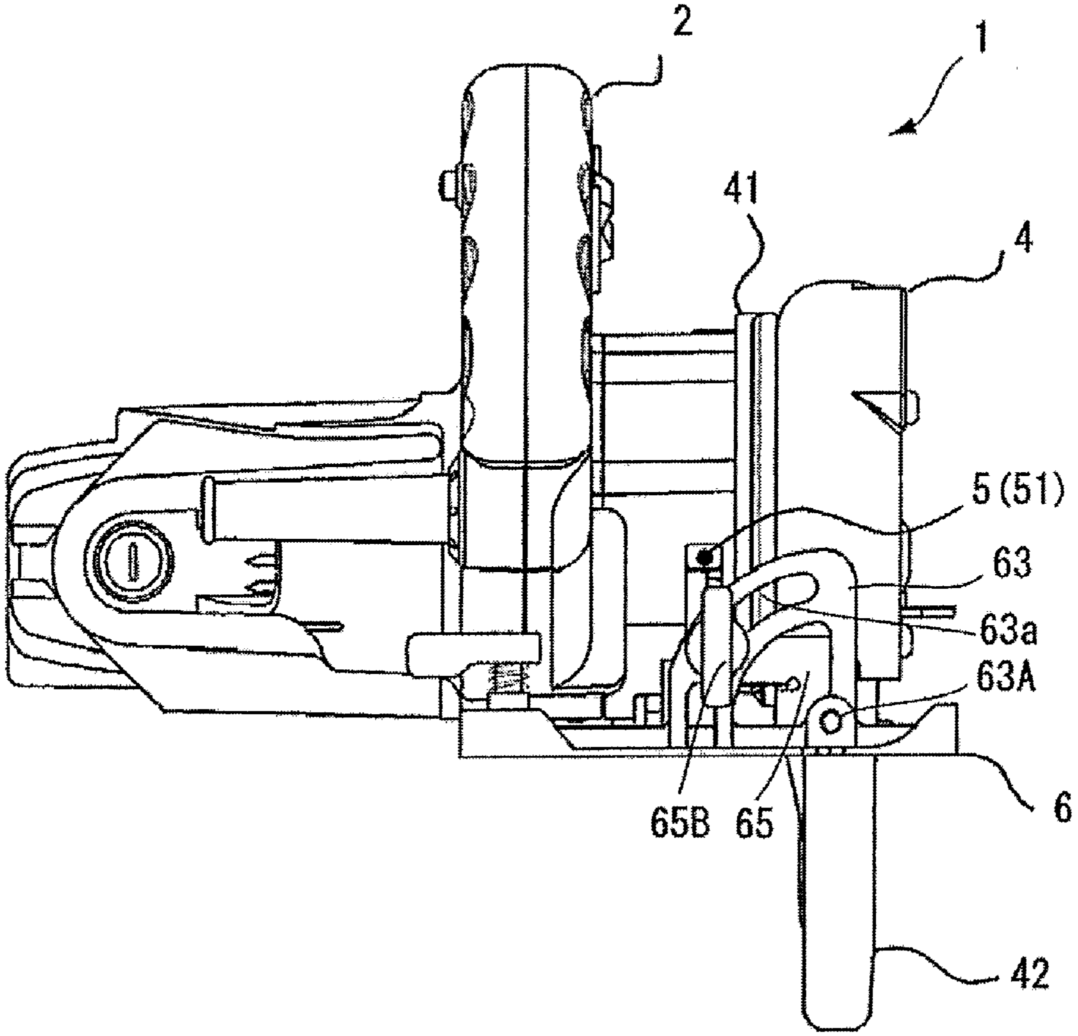
FIG. 3 is a rear view of the portable cutting tool shown in FIG. 1.

As shown in FIGS. 1 and 2, the first bevel plate 63 is provided upright at a rear side position of the opening 68 in the base member 61 in the cutting direction. As shown in FIGS. 2 and 3, the link connecting part 65 is secured to the first bevel plate 63. The first bevel plate 63 is configured to have a shape symmetrical to the second bevel plate 64 with the opening 68 in between. A first tilt axis part 63A (first tilt support part), which pivotally supports the link connecting part 65, is provided on a line of extension of the second tilt axis part 64A. An elongated hole 63*a* which is arcuate about the first tilt axis part 63A is formed in the first bevel plate 63.

A screw 65B to be screwed into a screw hole (not shown) formed in the link connecting part 65 and penetrating through the elongated hole 63*a* of the first bevel plate 63 is provided at the link connecting part 65. Fastening the screw 65B, the tilt angle of the link connecting part 65 relative to the first bevel plate 63 can be fixed at an arbitrary angle.

Figure 4:
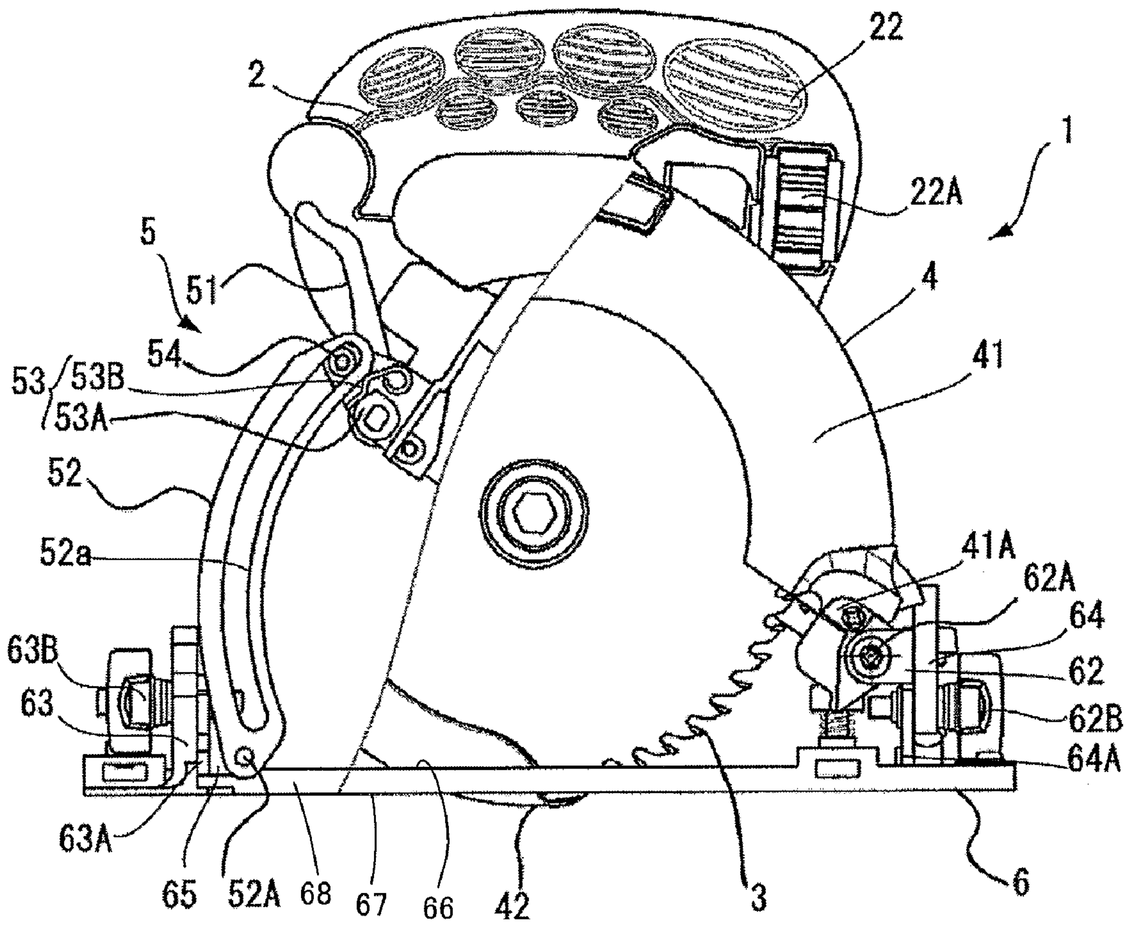
FIG. 4 is a side cross-sectional view of the portable cutting tool shown in FIG. 1 with the cutting depth adjusted.

The protrusion amount changing mechanism 5 mainly includes a lever 51, a link 52, a cam part 53, and a guide part 54 as shown in FIG. 4. As described above, the protrusion amount changing mechanism 5 is disposed between the circular saw blade 3 of the saw cover body part 41 and the motor 21A at a position facing one side surface of the circular saw blade 3. Therefore, the protrusion amount changing mechanism 5 does not excessively protrude rearward of the saw cover 4. This suppresses an increase in the front-back length of the circular saw 1. When the saw cover 4 including the circular saw blade 3 is tilted, the protrusion amount changing mechanism 5 does not protrude on the opposite side to the motor 21A for the circular saw blade 3. Therefore, tilting of the saw cover 4 is not interfered. This can therefore allow the saw cover 4 to be favorably tilted at a desired angle.

A cam 53A to be described later is formed integral with the lever 51. The lever 51 is positioned outside the saw cover 4, and the cam 53A is positioned inside the saw cover 4. The lever 51 is supported on the saw cover body part 41 in such a way as to be pivotable about an axis parallel to the rotational shaft 31 of the circular saw blade 3.

The link 52 is disposed in the saw cover 4, facing one side surface of the circular saw blade 3. The link 52 is connected to a pin 52A parallel to the rotational shaft 31 of the circular saw blade 3. The link 52 extends out from the link connecting part 65 in an arcuate shape along the outer periphery of the circular saw blade 3. Therefore, the link 52 is configured to tilt with respect to the base part 6 together with the link connecting part 65 and to be pivotable about the pin 52A. As shown in FIG. 4, the link 52 has an elongated hole 52*a* formed therein, penetrating the link 52 in the axial direction of the rotational shaft 31 of the circular saw blade 3 and extending in the direction of extension of the link 52.

The cam part 53 includes the cam 53A and a plate spring 53B which is an elastic member, and constitutes, together with the guide part 54, a fixing part. As shown in FIG. 4, the cam 53A is a well-known cam having a substantially an egg shape, and is positioned on the inner peripheral side of the arcuate link 52. The cam 53A pivots according to the top-down pivotal movement of the lever 51, so that a cam lobe, which is a protruding portion of the egg shape, urges the link 52. Accordingly, the cam 53A cooperates with the guide part 54 to hold the link 52, securing the link 52 to the cam part 53. As the link 52 is secured to the cam part 53, the housing 2 integral with the saw cover body part 41 provided with the cam part 53 is secured to the base part 6 to which the link connecting part 65 supporting the link 52 is connected.

The plate spring 53B is interposed between the cam 53A and the link 52 to transmit the urging force produced by the cam lobe of the cam 53A to the link 52. Being an elastic member, the plate spring 53B relaxes the urging force of the cam lobe of the cam 53A to the link 52, so that the link 52 can be urged with adequate force. Further, the contact of the cam 53A with the link 52 via the plate spring 53B restrains the pivotal movement of the cam 53A from being inhibited by the link 52. Even when the cam 53A, the link 52, etc. come with production errors, the lever 51 integral with the cam 53A can be operated within a predetermined pivotal range.

As the cam 53A pivots about the axis parallel to the rotational shaft 31 of the circular saw blade 3, the cam lobe moves in a direction orthogonal to the rotational shaft 31 of the circular saw blade 3. At the time the cam 53A urges the link 52 to secure the housing 2 to the base part 6, therefore, stress acting only in the front-back direction (or direction orthogonal to the rotational shaft 31 of the circular saw blade 3) is produced between the base part 6 and the housing 2 while stress is hardly produced in a direction orthogonal to the front-back direction (or direction parallel to the rotational shaft 31 of the circular saw blade 3). As the circular saw blade 3 is connected to the motor 21A held at the housing 2 and stress acting in the axial direction the rotational shaft 31 of the circular saw blade 3 is not produced between the base part 6 and the housing 2, so that the stress acting in the axial direction the rotational shaft 31 of the circular saw blade 3 is not produced at the circular saw blade 3. This suppresses reduction in the parallelism of the rotational surface of the circular saw blade 3 to the base part 6 in the lengthwise direction thereof.

The guide part 54 is positioned on the outside of the saw cover body part 41 and is inserted into the elongated hole 52*a* formed in the link 52. The insertion of the guide part 54 in the elongated hole 52*a* can allow the link 52 to be guided with respect to the housing 2 integral with the saw cover body part 41. This simple structure can allow the link 52 to be accurately guided to the cam part 53. A part of the link 52 is interposed between the guide part 54 and the cam 53A. As the cam lobe of the cam 53A urges the link 52, therefore, the guide part 54 cooperates with the cam 53A to hold and secure the link 52.

At the time the amount of protrusion (cutting depth) of the circular saw blade 3 of the circular saw 1 with the foregoing structure from the base part 6, the cam lobe of the cam 53A is disengaged from the plate spring 53B with the lever 51 pushed upward (lever 51 turned clockwise on the sheet of FIG. 4). Then, the saw cover 4 integral with the circular saw blade 3 is lifted upward with respect to the base part 6 with the pivotal axis part 62A being the axis. At this time, the guide part 54 is inserted into the elongated hole 52*a* of the link 52, so that the link 52 is guided by the guide part 54 to be always along the cam part 53.

With the protrusion amount of the circular saw blade 3 being set, the lever 51 is pushed down to rotate the cam 53A in such a way that the cam lobe abuts on the plate spring 53B as shown in FIG. 4. As a result, the link 52 is held by the guide part 54 and the cam part 53, and the saw cover 4 is secured to the base part 6, thus making it possible to define the protrusion amount of the circular saw blade 3 from the base part 6.

Figure 5:
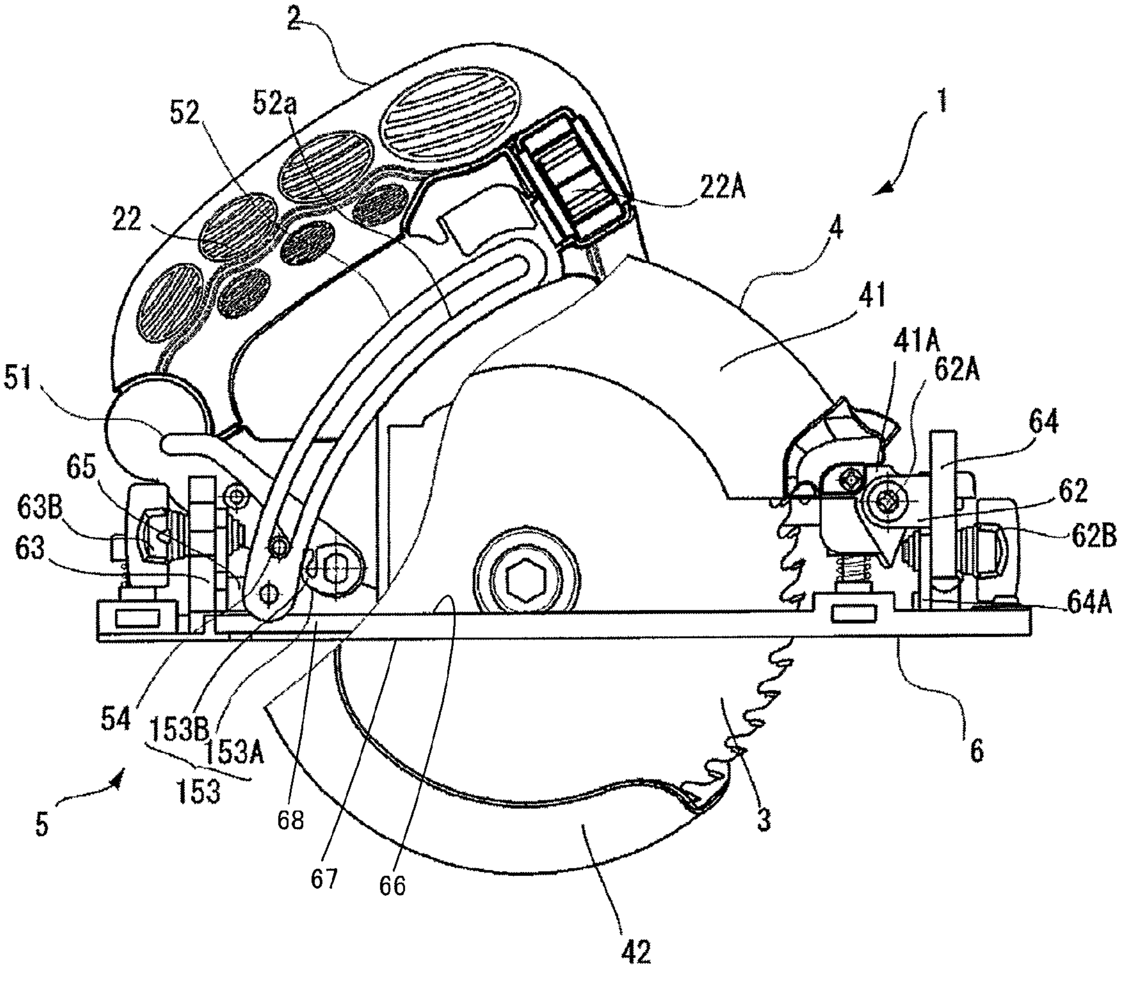
FIG. 5 is a side cross-sectional view of a portable cutting tool according to a first modification of the embodiment of the invention.
Figure 6A:
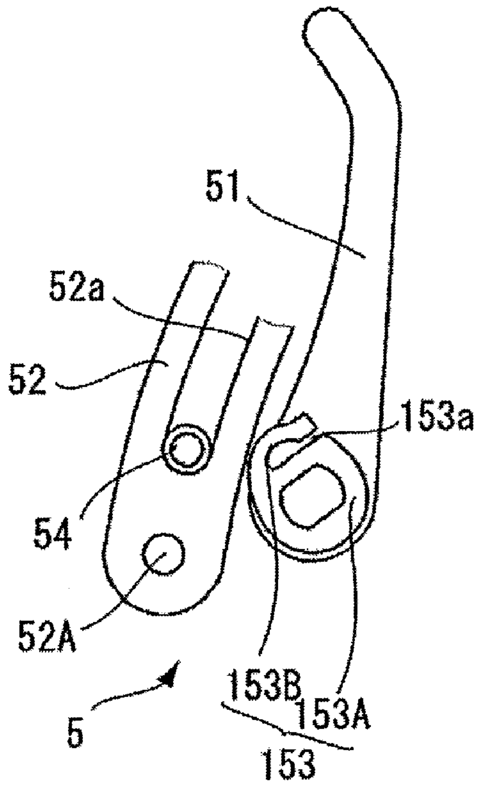
FIG. 6A is a partial cross-sectional view showing a fixing mechanism of the portable cutting tool shown in FIG. 5 with a cam being able to move with respect to a link.
Figure 6B:
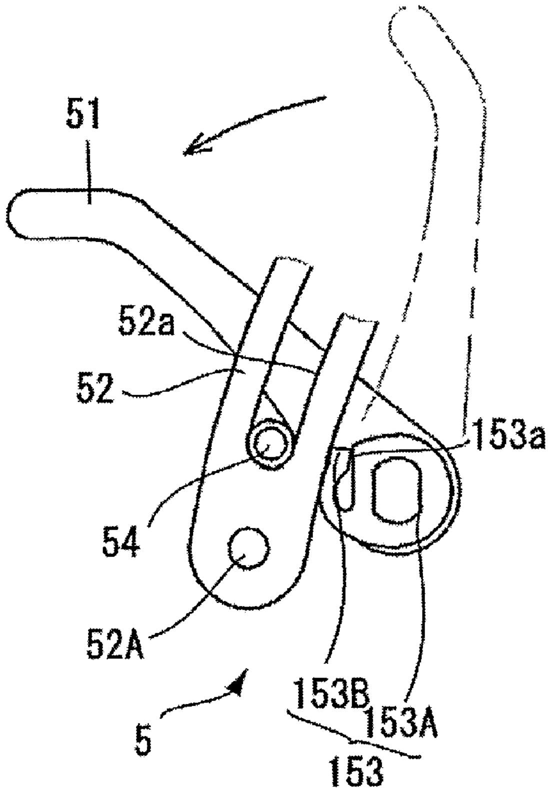
FIG. 6B is a partial cross-sectional view showing the fixing mechanism of the portable cutting tool shown in FIG. 5 with a cam being disable to move with respect to a link.

The portable cutting tool according to the present invention is not limited to the foregoing embodiment, and can be modified and improved in various forms within the scope of the appended claims. As a first modification, as shown in FIG. 5, for example, an elastic deforming portion 153B may be provided at the cam lobe of a cam 153A of a cam part 153. Specifically, as shown in FIG. 6A, the cam lobe portion of the cam 153A is cut to form a clearance 153*a*. Then, the elastic deforming portion 153B which elastically moves in a direction intersecting the diametric direction of the cam 153A. At the time of securing the link 52, the lever 51 is pushed down to cause the elastic deforming portion 153B to abut on the link 52 as shown in FIG. 6B. This narrows the clearance 153*a* so that the cam part 153 elastically urges the link 52, causing the link 52 to be favorably secured to the cam part 153.

Figure 7:
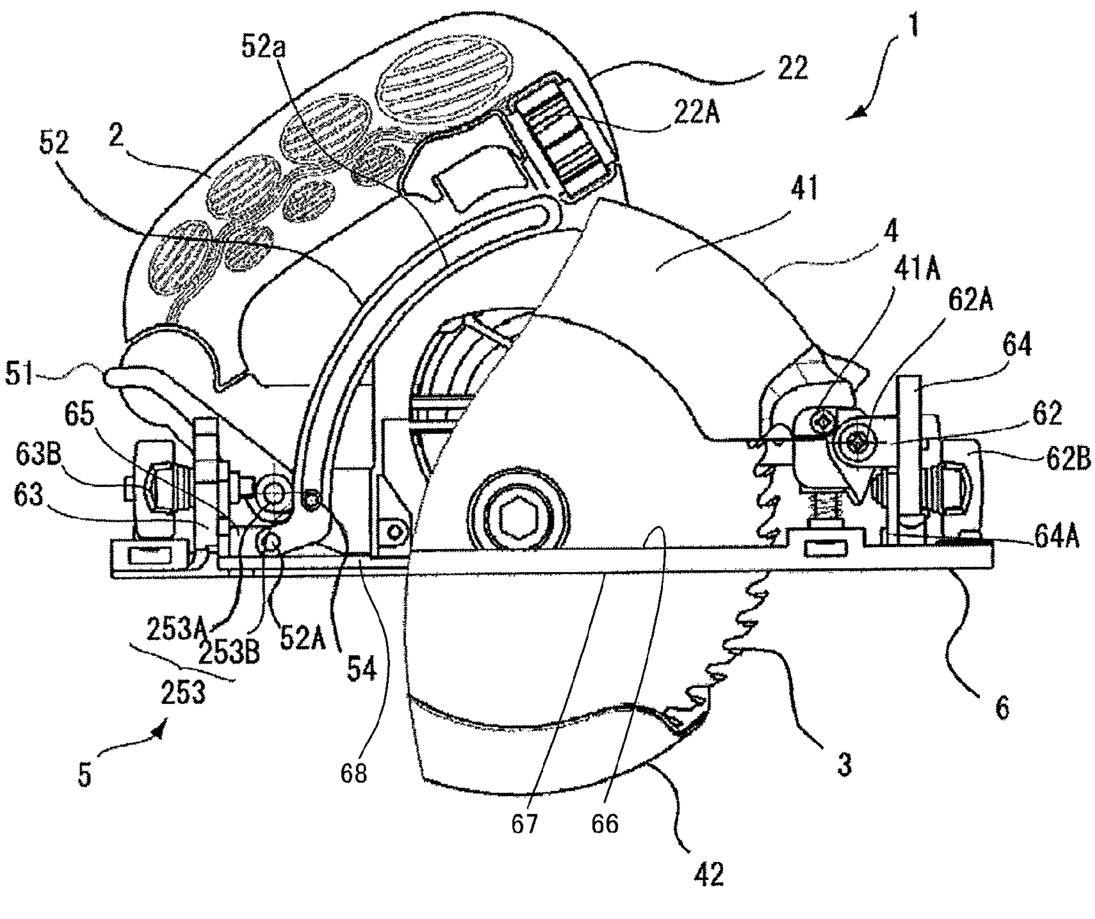
FIG. 7 is a side cross-sectional view of a portable cutting tool according to a second modification of the embodiment of the invention.
Figure 8:
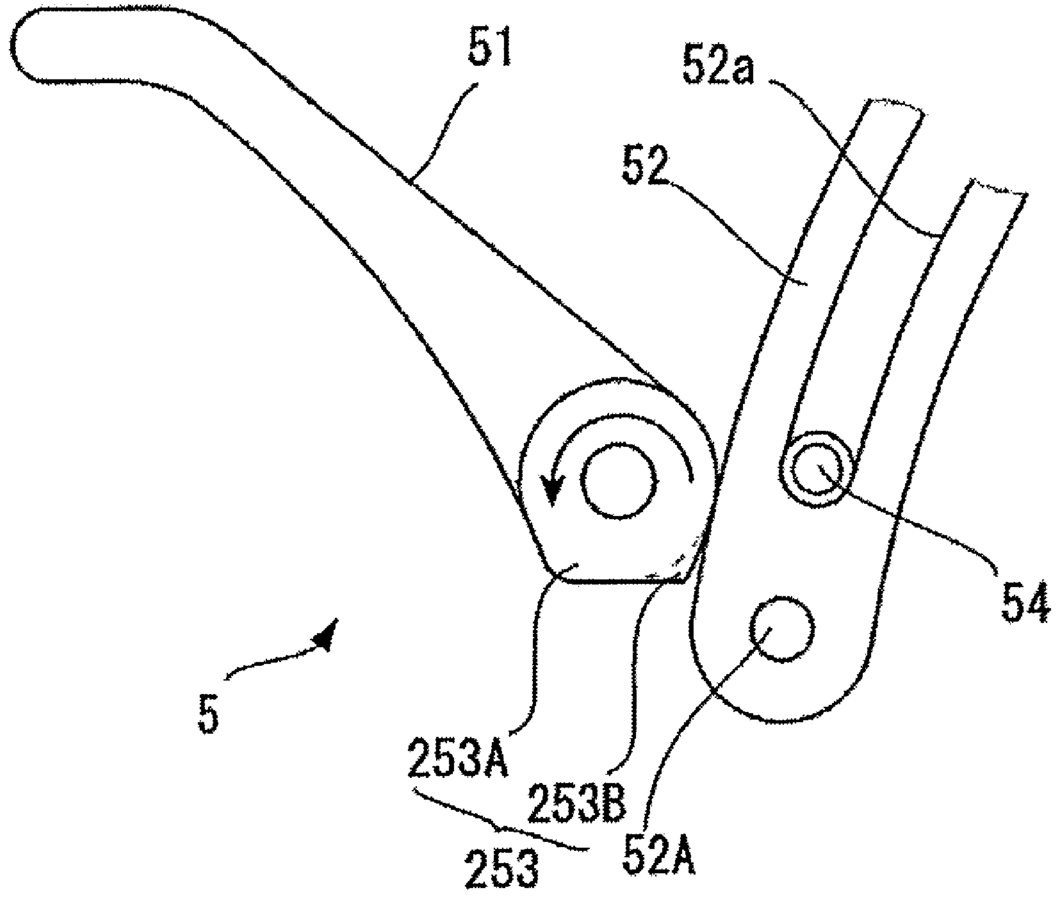
FIG. 8 is a partial cross-sectional view showing a fixing mechanism of the portable cutting tool shown in FIG. 7.

As a second modification, as shown in FIG. 7, a cam part 253 may be so disposed as to abut on the arcuate outer peripheral side of the link 52. At this time, as shown in FIG. 8, a cam lobe 253B is disposed at the cam 253A constituting the cam part 253 so as to be positioned on the base part 6 side. With such a structure, as the lever 51 is pushed down, the cam lobe 253B abuts on the link 52. Therefore, the cam lobe 253B and the guide part 54 cooperate to secure the link 52 to the cam part 253. When a user applies press-down force to the handle 22 with the link 52 secured by the cam part 253, the cam part 253 tends to move in a direction of approaching the base part 6 with respect to the link 52. In this case, the friction between the cam 253A and the link 52 generates counterclockwise force at the cam part 253 as shown by an arrow in FIG. 8. Because the cam lobe 253B is positioned on the base part 6 side (FIG. 7) of the cam part 253, however, the pressure of the cam lobe 253B on the link 52 increases, suppressing the counterclockwise pivotal movement of the cam part 253. The suppressed pivotal movement of the cam part 253 therefore suppresses the movement of the cam part 253 closer to the base part 6, thus suppressing a change in the protrusion amount of the circular saw blade 3.

Figure 9:
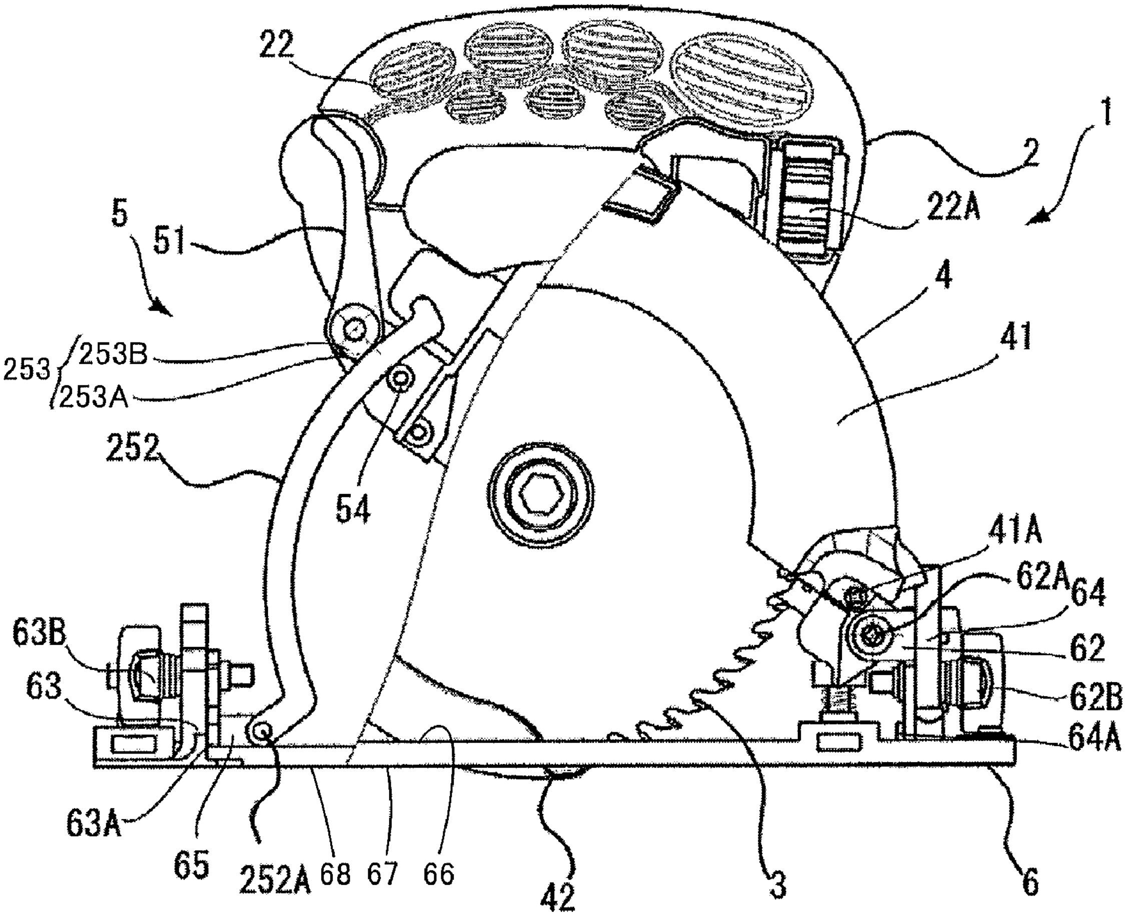
FIG. 9 is a side cross-sectional view of a portable cutting tool according to a third modification of the embodiment of the invention.

As a third modification, as shown in FIG. 9, a link 252 may be formed by an arcuate elongated member which is not formed with an elongated hole. In this case, the link 252 is disposed between a cam part 253 and the guide part 54. Accordingly, the cooperation of the cam part 253 and the guide part 54 can allow the link 252 to be secured to the cam part 253 as per the second modification. Such a link formed by an arcuate elongated member which is not formed with an elongated hole may be applicable to the foregoing embodiment as well as the first and second modifications.

Figure 10:
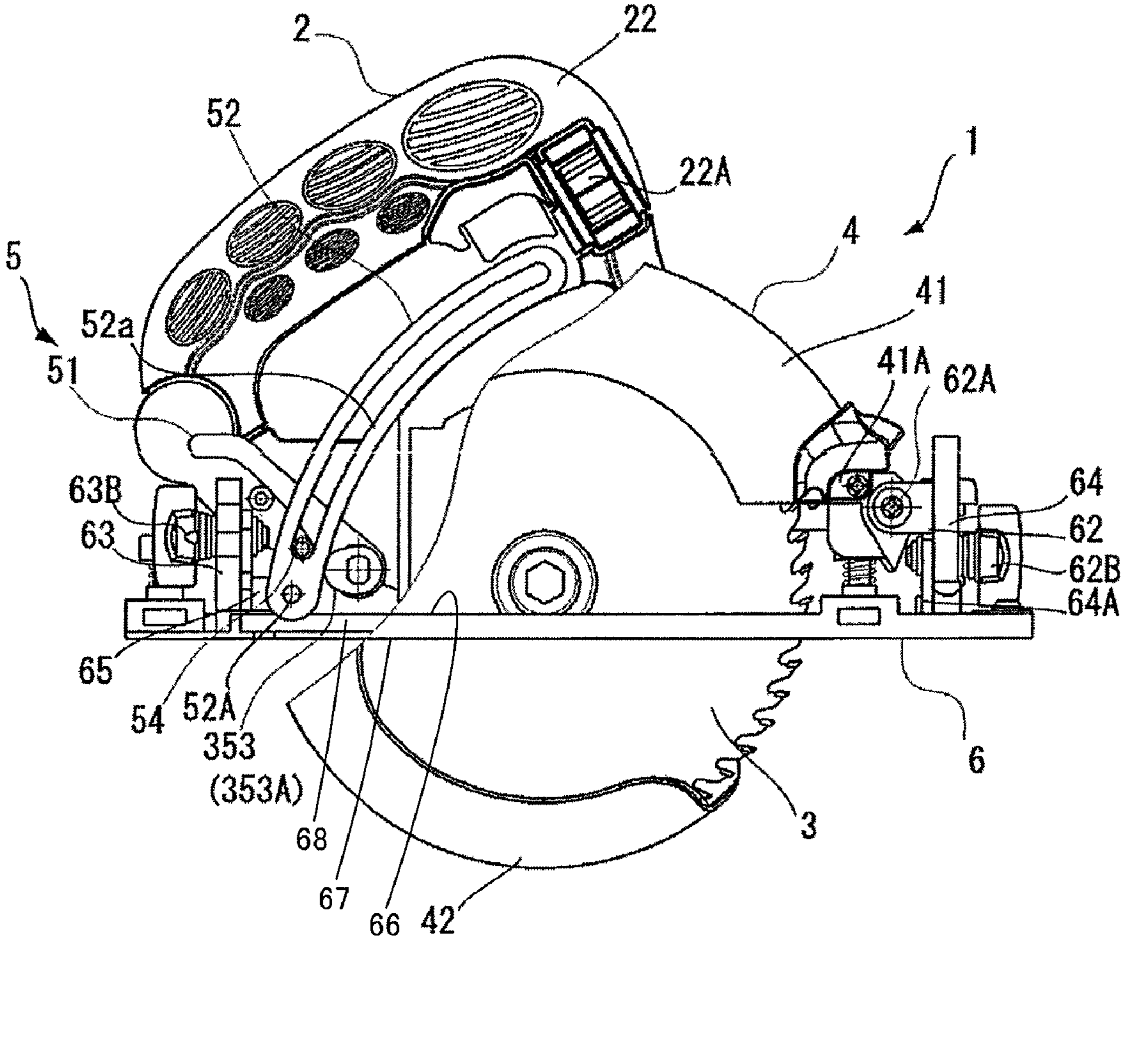
FIG. 10 is a side cross-sectional view of a portable cutting tool according to a fourth modification of the embodiment of the invention.

As a fourth modification, as shown in FIG. 10, a cam part 353 may comprise only a cam 353A.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A portable cutting tool comprising:

a housing that rotatably supports a cutting blade which is driven by a motor to cut a workpiece;

a base having a first side to be connected with the housing, and a second side being the other side of the base and abutting on the workpiece, and having an opening which penetrates the first side and the second side and through which the cutting blade is protrudable from the second side; and a protrusion amount changing mechanism that has a link part extending from one of the base and the housing, and a fixing part which is provided at the other one of the base and the housing, is arranged opposite to a side surface of the cutting blade, comes to a fixed state with respect to the link part when moved in one direction in a direction orthogonal to a rotational shaft of the cutting blade, and comes to a moving state to be movable with respect to the link part when moved in another direction in the direction orthogonal to the rotational shaft, whereby a protrusion amount of the cutting blade from the second side is changed as the fixing part is moved with respect to the link part, wherein the fixing part includes:

a lever part rotatably supported about an axis parallel to the rotational shaft of the cutting blade;

an abutment portion that moves in the one direction by a predetermined rotational operation of the lever part to abut on the link part; and a guide part that is provided in such a way as to guide the fixing part to be relatively movable along the link part and hold the link part between the guide part and the abutment portion, and cooperates therewith to set the fixing part to be in the fixed state with respect to the link part, at a time the abutment portion abuts on the link part, wherein the abutment portion has a cam which rotates about an axis parallel to the rotational shaft, and wherein the abutment portion has an elastic member interposed between the cam and the link part, and the cam abuts on the link part via the elastic member.

2. A portable cutting tool comprising:

a housing that rotatably supports a cutting blade which is driven by a motor to cut a workpiece;

a base having a first side to be connected with the housing, and a second side being the other side of the base and abutting on the workpiece, and having an opening which penetrates the first side and the second side and through which the cutting blade is protrudable from the second side; and a protrusion amount changing mechanism that has a link part extending from one of the base and the housing, and a fixing part which is provided at the other one of the base and the housing, is arranged opposite to a side surface of the cutting blade, comes to a fixed state with respect to the link part when moved in one direction in a direction orthogonal to a rotational shaft of the cutting blade, and comes to a moving state to be movable with respect to the link part when moved in another direction in the direction orthogonal to the rotational shaft, whereby a protrusion amount of the cutting blade from the second side is changed as the fixing part is moved with respect to the link part, wherein the fixing part includes:

a lever part rotatably supported about an axis parallel to the rotational shaft of the cutting blade;

an abutment portion that moves in the one direction by a predetermined rotational operation of the lever part to abut on the link part; and a guide part that is provided in such a way as to guide the fixing part to be relatively movable along the link part and hold the link part between the guide part and the abutment portion, and cooperates therewith to set the fixing part to be in the fixed state with respect to the link part, at a time the abutment portion abuts on the link part, wherein the abutment portion has a cam which rotates about an axis parallel to the rotational shaft, and wherein the cam is held in an abutment state to be abutment with the link part, and when the housing is moved with respect to the base to increase the protrusion amount of the cutting blade from the second side, the cam rotates in such a direction that a cam lobe abuts on the link part.

3. A portable cutting tool comprising:

a housing that rotatably supports a cutting blade which is driven by a motor to cut a workpiece;

a base having a first side to be connected with the housing, and a second side being the other side of the base and abutting on the workpiece, and having an opening which penetrates the first side and the second side and through which the cutting blade is protrudable from the second side; and a protrusion amount changing mechanism that has a link part extending from one of the base and the housing, and a fixing part which is provided at the other one of the base and the housing, the link part having an elongated hole formed therein and extending in a direction of extension thereof, characterized in that the fixing part comprises:

a lever part rotatably supported about an axis parallel to a rotational shaft of the cutting blade;

an abutment portion that moves in a direction determined by a rotational operation of the lever part to abut on the link part; and a guide part that is disposed movably in the elongated hole of the link part and holds the link part between the guide part and the abutment portion, wherein the abutment portion and the guide part hold the link part in a direction orthogonal to the rotational shaft, and wherein the fixing part comes to a fixed state with respect to the link part when moved in one direction in a direction orthogonal to the rotational shaft of the cutting blade, and comes to a moving state to be movable with respect to the link part when moved in another direction in the direction orthogonal to the rotational shaft, whereby a protrusion amount of the cutting blade from the second side is changed as the fixing part is moved with respect to the link part.

4. The portable cutting tool according to claim 1, wherein the abutment portion has a cam which rotates about an axis parallel to the rotational shaft.

5. The portable cutting tool according to claim 4, wherein the cam has an elastically deformable elastic region at a cam lobe part, and abuts on the link part at the elastic region.

6. The portable cutting tool according to claim 1, wherein the motor is disposed facing one side surface of the cutting blade, and the fixing part is disposed between the motor and the cutting blade in a direction parallel to the rotational shaft of the cutting blade.

7. The portable cutting tool according to claim 1, wherein the housing further comprises a saw cover that covers substantially a half of that portion of an outer periphery of the cutting blade which protrudes above the first side, and a pivotal support part that connects the housing to the base in such a way as to be pivotable about an axis parallel to the rotational shaft is provided near one end portion of the saw cover.

8. The portable cutting tool according to claim 7, wherein a first tilt support part that pivotably supports the protrusion amount changing mechanism about an axis orthogonal to the rotational shaft and parallel to the base is provided between the protrusion amount changing mechanism and the base, and a second tilt support part that pivotably supports the pivotal support part coaxially with the first tilt support part is provided between the pivotal support part and the base.

* * * * *